(12) United States Patent
Mehr et al.

(10) Patent No.: US 6,571,356 B1
(45) Date of Patent: May 27, 2003

(54) INTERFACE SYSTEM FOR IN-CIRCUIT EMULATOR

(75) Inventors: Jamshid Mehr, Portland, OR (US); Gregory Charles Savin, Portland, OR (US)

(73) Assignee: Microtek International, Hillsboro, OR (US)

( * ) Notice: Subject to any disclaimer, the term of this patent is extended or adjusted under 35 U.S.C. 154(b) by 0 days.

(21) Appl. No.: 09/496,381

(22) Filed: Feb. 2, 2000

(51) Int. Cl.[7] .............................................. G06F 11/00
(52) U.S. Cl. .......................................... 714/28; 703/28
(58) Field of Search .............................. 714/27, 28, 29, 714/38, 45, 57; 703/26, 28

(56) References Cited

U.S. PATENT DOCUMENTS

| | | | |
|---|---|---|---|
| 5,850,511 A | * 12/1998 | Stoecker et al. | 714/38 |
| 5,903,718 A | * 5/1999 | Marik | 714/38 |
| 5,974,532 A | * 10/1999 | McLain et al. | 712/208 |
| 5,995,744 A | * 11/1999 | Guccione | 703/23 |
| 6,260,160 B1 | * 7/2001 | Beyda et al. | 714/27 |
| 6,530,047 | * 3/2003 | Edwards et al. | 714/724 |

* cited by examiner

*Primary Examiner*—Robert Beausoliel
*Assistant Examiner*—Gabriel Chu
(74) *Attorney, Agent, or Firm*—Daniel J. Bedell; Smith-Hill and Bedell

(57) ABSTRACT

An interface system enables conventional software applications running on host computers linked via a network to communicate with in-circuit emulators having component ports accessed through the network. The interface system represents each in-circuit emulator as a separate communication object model (COM) object. Each COM object has a set of interfaces, with each interface including a set of methods for carrying out various in-circuit emulator programming and data transfer functions. To communicate with an emulator, a software application links to an instance of the emulator's COM object and thereafter makes calls to the methods included in the object's interfaces. The system permits an application linking to an instance of an in-circuit emulator's COM object to optionally block other applications from linking to other instances of that COM object to prevent conflicts in control over the in-circuit emulator.

18 Claims, 3 Drawing Sheets

INTERFACE SYSTEM FOR IN-CIRCUIT EMULATOR

BACKGROUND OF THE INVENTION

1. Field of the Invention

Figure 1:
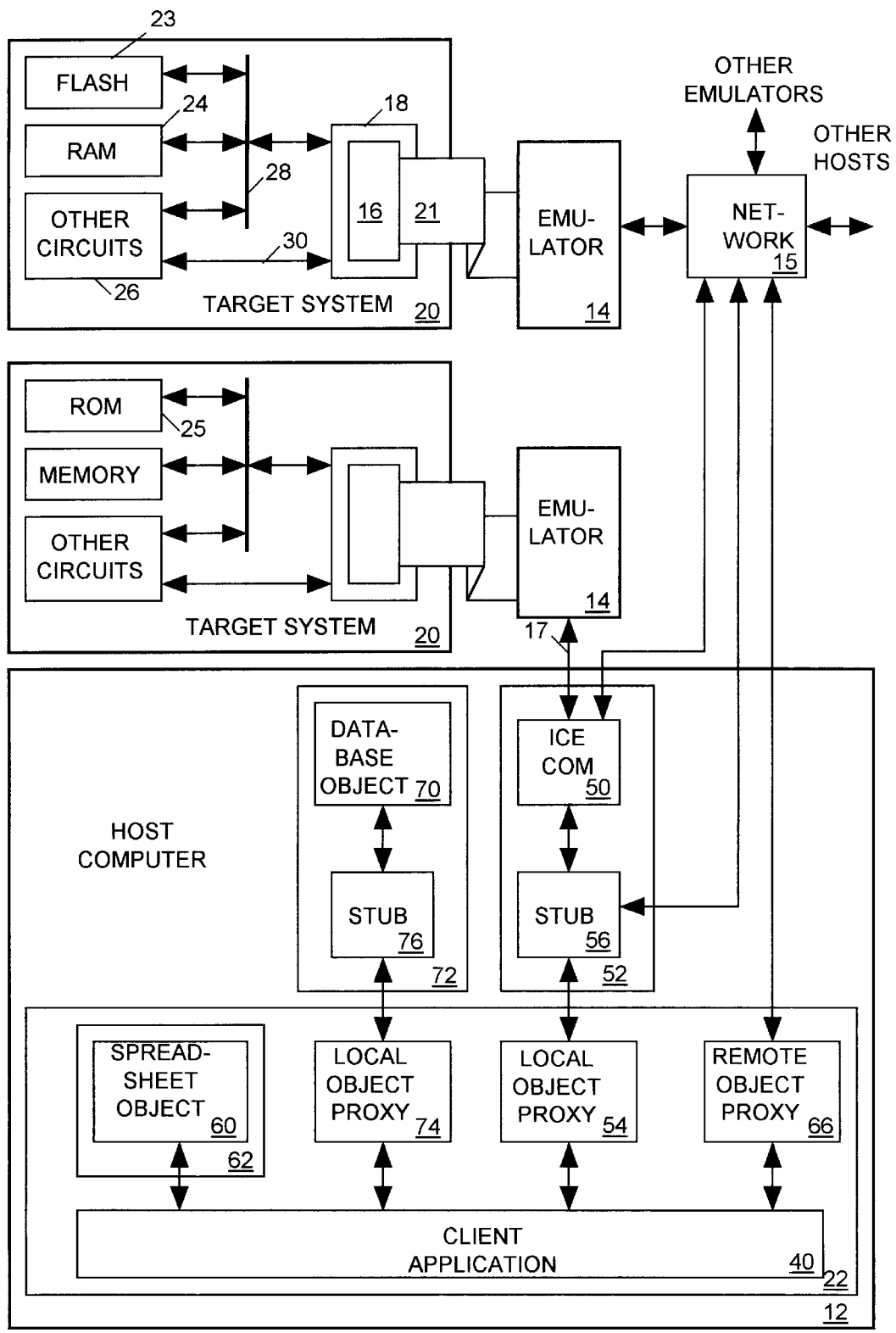

The present invention relates in general to in-circuit emulators, and in particular to a system permitting conventional software applications to easily communicate with an in-circuit emulator.

2. Description of Related Art

When developing and debugging a microprocessor-based system it is helpful to monitor and the input/output (I/O) bus of its microprocessor and to record data representing the succession of data, address and control signals appearing on that bus. Such data can be analyzed by diagnostic software running on an external host computer to determine the behavior of the microprocessor and other components of the target system in which the microprocessor is installed. Many microprocessors include diagnostic control terminals enabling a host computer accessing those terminals to carry out such diagnostic activities such as halting or stepping microprocessor operation and viewing or altering contents of its internal registers. However when a microprocessor is installed in a socket on a circuit board in its target system there is usually no provision for providing an external host computer with access to the microprocessor's bus or diagnostic control terminals.

A typical "in-circuit emulator" (ICE) includes a connector that plugs into the socket on a target system circuit normally holding the microprocessor. The target system's microprocessor is installed in another socket within the emulator, and the emulator links the connector to its internal microprocessor socket so that the microprocessor can behave as if it were plugged into its normal socket within the target system. An emulator includes circuits that can monitor the microprocessor's I/O bus, acquire and store data representing a sequence of signal states appearing on that bus, and make that stored data available to software running on a host computer. A typical in-circuit emulator also includes circuits that allow the host computer to access the microprocessor's diagnostic control terminal and to directly read or write access memories within the target system via the microprocessor's bus. An emulator may also include "overlay" memory that can be substituted for, or augment, target system memory that the microprocessor normally accesses.

Although a variety of software tools running in a host computer can configure and control an in-circuit emulator and can acquire and process the various types of data it collects, such software tools must be custom adapted to communicate with the emulator. Thus while an engineer developing and debugging target system microprocessor hardware or software might like to employ conventional, general purpose data processing software, such as for example a spreadsheet, to control an emulator and to obtain and process its output data, general purpose data processing software is not adapted to communicate directly with an in-circuit emulator.

What is needed is a system for allowing conventional data processing software to easily communicate with an in-circuit emulator.

SUMMARY OF THE INVENTION

An interface system in accordance with the present invention enables conventional software applications to easily communicate with an in-circuit emulator.

In accordance with one aspect of the invention, the interface system represents the in-circuit emulator as a component object model (COM) object. The COM object includes a set of interfaces, each including methods for carrying out various in-circuit emulator programming and data transfer functions. To communicate with an emulator, a software application links to an instance of the emulator's COM object and thereafter may make calls to the methods included in the object's interfaces. The client application and the COM object make calls and returns simply by writing data to a reserved area of memory. This makes all other aspects of the COM object implementation transparent to the client application. By providing a COM object to handle direct communications with an in-circuit emulator, any conventional software application capable of communication via conventional COM protocol can indirectly control and communicate with an in-circuit emulator.

In accordance with another aspect of the invention, the in-circuit emulator includes a network interface allowing a COM object running on any computer connected to the network to communicate with the in-circuit emulator. Thus using conventional COM protocol, an application running on any platform connected to the network can communicate with the in-circuit emulator via remote or local procedures calls to an instance of the in-circuit emulator's corresponding COM object object.

In accordance with a further aspect of the invention, the interface system permits a first application linking to an instance of an in-circuit emulator's COM object to optionally block other applications running elsewhere in the network from linking to other instances of that COM object to prevent conflicts in control over the in-circuit emulator.

It is accordingly an object of the invention to provide an interface system for an in-circuit emulator permitting conventional software applications to easily communicate with the in-circuit emulator.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 2:
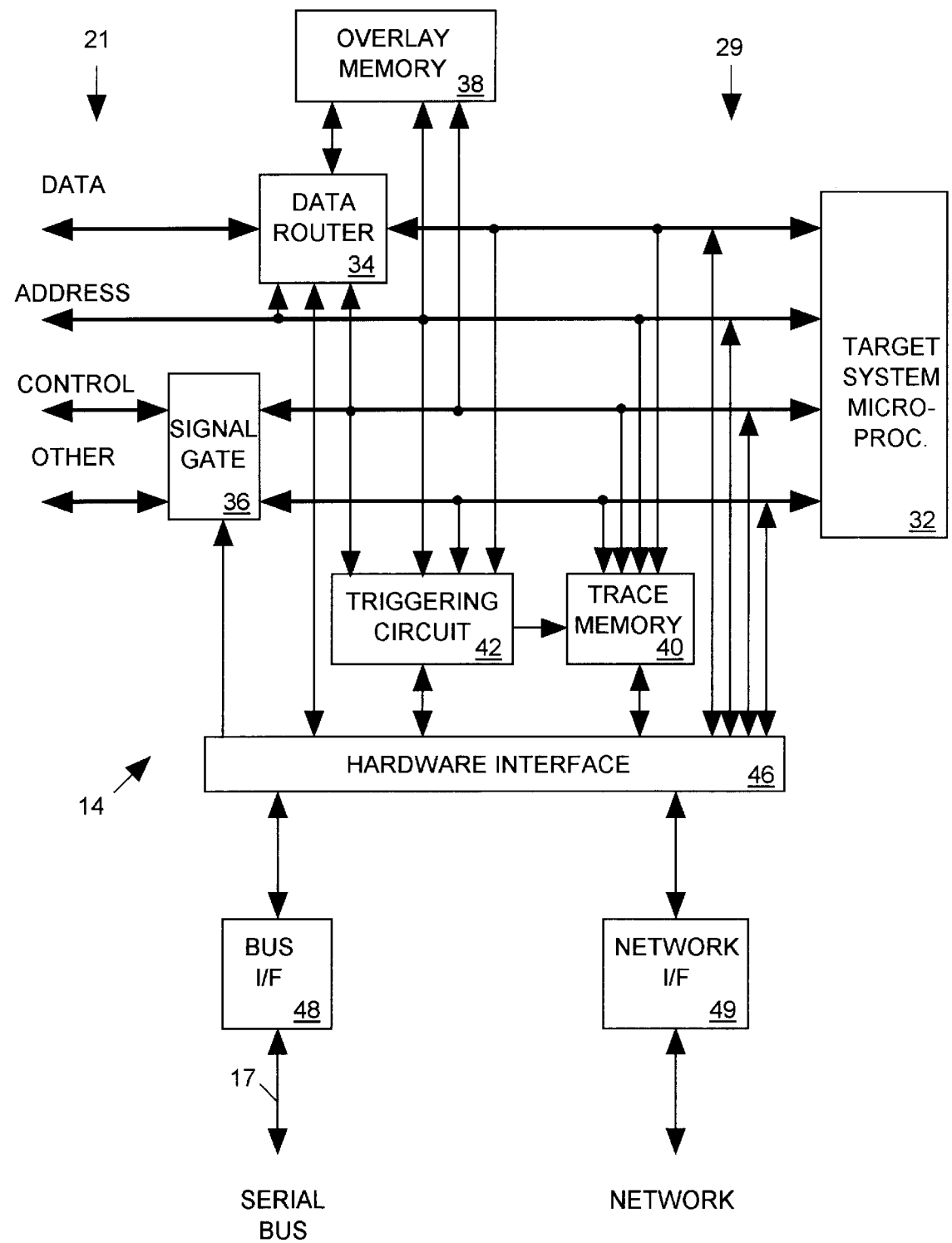
Figure 3:
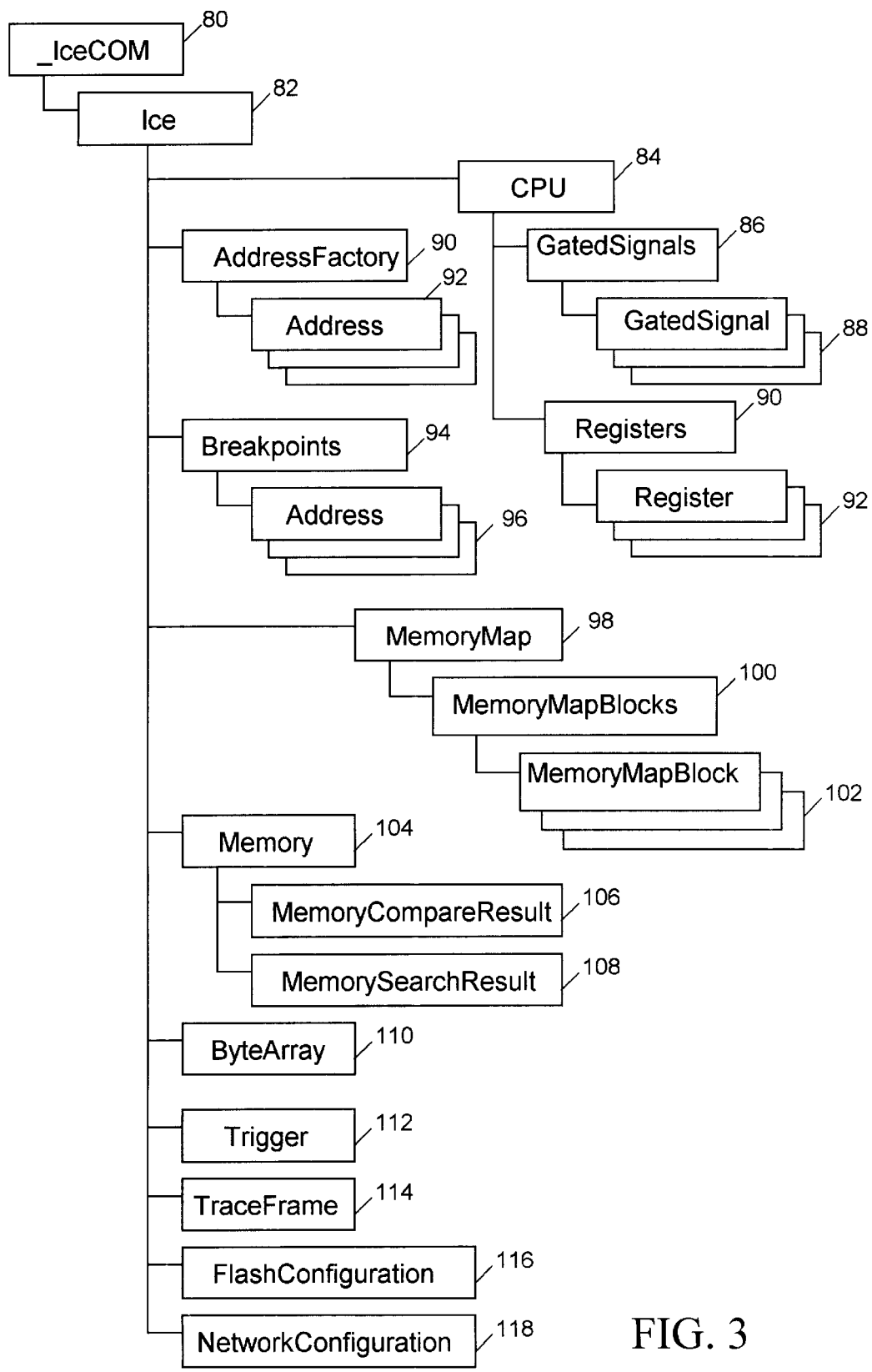

FIG. 1 depicts in block diagram form an in-circuit emulation and diagnostic system in accordance with the present invention, FIG. 2 depicts one emulator of the in-circuit emulation and diagnostic system of FIG. 1 in more detailed block diagram form, and FIG. 3 illustrates an IceCOM object model showing relationships between IceCOM interfaces and data objects.

DESCRIPTION OF THE PREFERRED EMBODIMENT(S)

The present invention relates to an interface system permitting conventional software applications such as for example a spread sheet or a data base program to control and communicate with an in-circuit emulator.

FIG. 1 is a block diagram of an in-circuit emulation and diagnostic system 10 in accordance with the present invention including one or more host computers 12 linked to a set of in-circuit emulators 14. Each emulator 14 includes a microprocessor that is normally plugged into a socket 18 within an electronics system under test ("target system") 20. A connector 16, linked to the microprocessor within each emulator 14 via a ribbon cable 21, plugs into socket 18 so that the microprocessor within the emulator may act as if it were directly installed in socket 18. Each target system 20 may include, for example, a flash memory 23 or a read only memory (ROM) 25, a random access memory (RAM) 24 or other circuits 26 that communicate with the target system microprocessor either through a bus 28 or other control lines 30 connected to the microprocessor via terminals of socket 18.

As discussed in more detail below, each emulator 14 includes circuits that can, for example, acquire and store data representing a sequence of signal states appearing on the microprocessor's input/output (I/O) bus and access the microprocessor's diagnostic control terminals. Each emulator 14 is linked either to an individual host computer 12 via a serial bus 17 or to one or more host computers through a conventional Ethernet or other network 15. Each emulator 14 permits any client process 22 running within a host computer 12 to which is it linked to configure and control emulator operation and to obtain the diagnostic data the emulator acquires.

FIG. 2 depicts one emulator 14 of FIG. 1 in more detailed block diagram form. Referring to FIGS. 1 and 2, emulator 14 includes the target system's microprocessor 32. Address lines of the microprocessor's I/O bus 29 are directly connected to address lines (ADDRESS) of ribbon cable 21. Data lines of I/O bus 29 are connected to data lines (DATA) of ribbon cable 21 through a data router circuit 34, and control and other lines of bus 29 are linked to corresponding lines of cable 21 through a signal gate circuit 36.

Normally router 34 connects the DATA lines of I/O bus 29 to the DATA lines of cable 21. However emulator 24 also includes an overlay memory 38 also connected to the ADDRESS and CONTROL lines, and DATA router 34 can be programmed to route data between microprocessor 32 and overlay memory 38, rather than the DATA lines of cable 21, when the address on the ADDRESS lines of bus 29 falls within a defined range or ranges. Thus emulator 14 can substitute overlay memory 38 for portions of the address space normally occupied by RAM 24 or other circuits of the target system. Emulator 14 may also use overlay memory 38 to augment the memory space of the target system. Thus, for example, overlay memory 38 can provide a substitute for RAM 24 target system 20 when RAM 24 is not yet installed in the target system or can hold special diagnostic subroutines for microprocessor 32.

Signal gate 36, inserted in the path of CONTROL and OTHER lines of microprocessor I/O bus 29, can be programmed to take control of various signals appearing on those lines that normally pass between microprocessor 32 and circuits within target system 20.

Emulator 14 also includes a "trace memory" 40 for storing a succession of data, address and control signal states appearing on microprocessor bus 29. A triggering circuit 42 monitors the DATA, ADDRESS and CONTROL lines and produces trigger signals to start and stop data acquisition by trace memory 40 when the triggering circuit recognizes particular patterns on those lines. For example, triggering circuit 42 may be programmed to tell trace memory 40 to start or stop data acquisition when a program being executed by microprocessor 32 reaches points in a program evidenced by particular addresses appearing on the ADDRESS bus or to start or stop data acquisition in response to an interrupt or other signal appearing on the CONTROL or OTHER lines.

Emulator 14 also includes a conventional hardware interface circuit 46 for delivering programming data to router 34, signal gate 36, and triggering circuit 42, for accessing data stored in trace memory 40, and for monitoring trigger signals produced by triggering circuit 42. Hardware interface 46 may be linked to a host computer via a serial bus 17 and a conventional serial bus interface 48 or via a conventional network interface 49.

Interface circuit 46 allows an external host computer 12 (FIG. 1) to access the various lines of I/O bus 29 for example to read or write access overlay memory 38, target system RAM 24, flash memory 23, or other circuits 26 of target system 20 (FIG. 1) that may be accessible though bus 28 (FIG. 1). Interface circuit 46 also allows the host computer 22 to access dedicated diagnostic or control lines of microprocessor 32. For example many microprocessors include a terminal for receiving a HALT signal that can temporarily halt microprocessor operation, and a host computer may send HALT signals to microprocessor 32 via interface 46. Some microprocessors also include diagnostic I/O terminals permitting read and write access to internal registers within the microprocessor. Hardware interface 46 provides an external host computer with access to those diagnostic terminals.

Component Object Model (COM) Communication

Although a variety of prior art software tools that may run in a host computer 12 can transmit control data to a conventional in-circuit emulator and acquire and make use of the type of data it collects, such software tools must be custom adapted to communicate with each particular type of emulator. While an engineer developing and debugging microprocessor software might like to employ, for example, a conventional spreadsheet or database program to supply control data to an emulator and to acquire and process output data produced by an emulator, a conventional spreadsheet or database program has no provisions for directly communicating with a typical prior art emulator.

The present invention allows conventional software such as spreadsheets, databases and the like that are capable of communicating with other software components via the well-known "component object model" to easily communicate with one or more in-circuit emulators 14. The "component object model" (COM) is a standard application programming interface (API) originally developed to allow software components to communicate with one another even though they may be written in different languages or run on separate, but interconnected, platforms. In accordance with the invention, software that controls and communicates with each emulator 14 is configured as a "COM object" that is capable of communicating with conventional software via conventional COM protocol.

A "COM" object is a piece of compiled code running as a server process on a computer system for providing services in response to procedure calls from "client" processes also running on the computer system. Each COM object may support one or more "interfaces", with each COM interface being associated with one or more of the procedures (methods) that the COM object can carry out. A client application makes procedure calls to a COM object, passing arguments of each procedure to the COM object by writing data to a particular area of memory assigned to one of the COM object's interfaces. The COM object returns data to the client application in response to a procedure call by writing the return data to another area of memory. As long as the data they exchange is formatted and positioned in memory in a manner both client and server processes expect, they can communicate with each other regardless of any other aspects of their implementation including the programming language in which they are written, the nature of the platforms on which they run, or the locations of those platforms within a network.

Every COM object and every interface of every COM object has a unique, invariant name, or "globally unique identification ("GUID"). A COM application programming interface (API) running within each computer of a network maintains a component database (or "library") for registering each COM object and each interface of each COM object available to the network. Before a client application begins making calls to procedures of a particular COM object interface, it need only send a request to the local COM API identifying the COM object interface. The COM API responds by initiating a server process for the COM object on wherever platform within the network the COM object resides. That server process then creates an instance of the COM object and returns to the client application a pointer to the COM object interface. Thereafter the client application can make procedure calls to that COM object's interface. The client application need only know the names of the COM object and its interfaces, and understand the syntax of the function calls needed to invoke the methods the COM object executes. Otherwise all other aspects of the COM object including its nature, operation and location in the network are transparent to the client application. Details of communications between a client application and a COM object are handled by the COM API according to standard COM protocol.

In-Circuit Emulator COM

In accordance with the invention software controlling each in-circuit emulator 14 is configured as an in-circuit emulator COM ("IceCom") object 50 that uses COM protocol to communicate with external processes. Accordingly, functions associated with controlling and obtaining data from each emulator 14 are implemented as methods of various interfaces of IceCom object 50. This allows conventional software applications running on host computer 12 that are otherwise capable of using conventional COM protocol to easily communicate with each emulator 14 to which host computer 12 is linked via a serial bus 17 or network 15.

A client process 22 running in host computer 12 may be, for example, a spreadsheet program wherein the contents of the data cells of a spreadsheet are accessed by a spreadsheet COM object 60 implemented by an in-process server 62 running within client process 22. Some of the cells of the spreadsheet may contain data for programming an emulator 14 for carrying out a test while other cells of the spreadsheet may store or process output data produced by an emulator 14 as a result of the test. A client application 40, such as for example a spreadsheet script or macro running in client process 22, may use conventional COM protocol to make function calls to acquire the programming data from spreadsheet object 60 and to forward that data to IceCom object 50 via a local object proxy 54 running in client process 22 and a stub 56 running in local server process 52. Similarly client application 40 may make function calls to IceCom 50 to obtain emulator 14 output data and may make function calls to spreadsheet object 60 forwarding that emulator output data to particular spreadsheet cells. Client application 40 may also communicate with other COM objects such as for example a database object 70 running in another local server process via another local object proxy 74 and stub 76. For example, client application 40 may obtain emulator programming information from the database object 70 and deliver emulator output data to the spreadsheet object. Thus client application 40 may use conventional COM protocol to communicate with one or more other software applications such as the example spreadsheet and database programs and with an emulator 14 via COM objects 50, 60 and 70.

The IceCOM object that controls a particular emulator 14 need not reside in the host computer 12 running the client application seeking to communicate with the emulator. In such case, client application 40 communicates with an IceCOM object 50 running in a remote host computer via a locally implemented "remote" object proxy 66 which accesses the object's stub 56 via the network. The operating system's COM API responds to a request from the client application for a connection to a particular IceCOM 50 by creating an instance of the IceCOM 50 in the platform in which the IceCOM resides and by establishing either a local object proxy 54 or a remote object proxy 66 within the local process 22 and a stub 56 in the remote process to handle communications between the local client application 40 and the remote IceCOM 50. The client application therefore need not be concerned with which host computer runs the IceCOM object 50 or how the IceCOM object communicates with an emulator 14. Those details are handled by the COM API using standard COM protocols.

Emulator Sharing Control

Conventional COM protocol allows more then one client application to make use of the services provided by a COM object simply by creating a new instance of the COM object for each client application requiring the object's services. Similarly, emulator interface system 10 of the present invention can creates an new instance of an IceCOM object 50 associated with a particular emulator 14 whenever any client application 40 in the network wants to communicate with that emulator. Thus more than one client application 40 can have concurrent access to an emulator via separate instances of the same IceCOM. However unless the separate client applications are closely coordinated, such concurrent access can lead to conflicts. For example two engineers could send competing programming information to the same emulator 14. Thus the IceCOM system of the present invention allows the client application requesting the first instantiation of an IceCOM 50 accessing an emulator 14 to specify whether access to that IceCOM may be shared by other instances of the IceCOM. The COM API then makes a note of whether such access is to be shared or blocked. When access is to be shared, the COM API honors subsequent requests for additional instances of the IceCOM object thereby permitting other applications to share access to the emulator. However when access is blocked, COM API refuses to create further instances of the IceCOM object until the client application accessing the first IceCOM instance releases its connection to that instance.

IceCOM Interfaces

FIG. 3 illustrates an IceCOM object model showing relationships between IceCOM interfaces and data objects. The various IceCOM interfaces are summarized below.

_IceCOM

An interface 80 ("_IceCOM") is the root of the IceCOM system. To access an emulator 14, a client application first invokes instance of the _IceCOM via the COM API. The _IceCOM 80, interface includes methods allowing a client to specify various operation parameters of the emulator including whether the emulator may be shared by multiple clients. Some _IceCOM methods permit an administrative client communicating through the emulator's serial port to configure the emulator hardware when it is first installed, for example to tell it whether it is to communicate with client applications through its serial or network port, to set its communication baud rates, or to assign it a network address.

Ice

An Ice interface 82, created via a method of _IceCOM, exposes other interfaces of emulator 14. Ice interface 82 includes methods, for example, allowing a client to start and stop emulation, to make the emulator step through a program, to program the emulator to notify the client when a particular event occurs, and to determine the cause of a most recent break in emulation. Other IceCOM interface methods allow an administrative client to determine or alter the configuration various features of the emulator such as overlay memory size and to configure and perform various operations on the target system's flash memory 23 (FIG. 1).

CPU

A CPU interface 84 specific to the particular type of microprocessor 32 (FIG. 2) an associated emulator is emulating, includes methods enabling a client application to obtain information about the microprocessor stored in the emulator and to access the microprocessor's diagnostic control inputs, for example, to set the microprocessor's mode of operation. Instantiation of the CPU interface 84 also exposes interfaces described below that are specific to the target microprocessor.

GatedSignals, GatedSignal

A GatedSignals interface 86 exposed by CPU interface 84 further exposes a set of GatedSignal interfaces 88, each corresponding to a separate CONTROL or OTHER signal gated by signal gate 36 of FIG. 2. Each GatedSignal interface 88 includes methods allowing a client application to ascertain and/or set the state of the corresponding CONTROL and OTHER signals.

Registers, Register

A Registers interface 90 exposed by CPU interface 84 makes available a set of Register interfaces 92, each corresponding to an internal register within target system microprocessor 32 accessible via hardware interface 46 (FIG. 2) and the microprocessor's diagnostic terminals. Each Register interface 92 includes methods allowing the client to determine various information about the register and to read and write access the register.

Address Factory, Address

An AddressFactory interface 90 exposed by Ice interface 82 creates a set of Address objects 92, each corresponding to a separate virtual, physical or linear address space of target system microprocessor 32 (FIG. 2). Each Address object 92 is a data structure recording various parameters relative to the its corresponding address including the nature and contents of the address. AddressFactory interface 90 provides a set of methods for accessing each address object for example, to allow a client application to read and write access the corresponding memory address, to learn or set the address type (virtual, physical or linear) or to perform various logical operations on addresses (add, compare, etc.).

Breakpoints, Addresses

A target system microprocessor 32 typically has internal debugging circuits controlled by the OTHER signal inputs that can halt microprocessor operation when it reaches predetermined "breakpoint" addresses. A Breakpoints interface 94 includes methods permitting a client to add and delete breakpoint Address objects 96 defining the various breakpoint addresses.

MemoryMap, MemoryMapBlocks, MemoryMapBlock

A MemoryMap interface 98, a MemoryMapBlocks interface 100 and a MemoryMapBlock interface 102 include methods allowing a client application to allocate blocks of overlay memory 38, flash memory 23 or target system RAM 24 address space by appropriately configuring data router 34 of FIG. 2. Other methods allow the client application to read and access those memory blocks on a block-by-block basis.

Memory, MemoryCompareResult, MemorySearchResult

A Memory interface 104, a MemoryCompareResult interface 106, and a MemorySearchResult interface 108 include methods allowing a client application to define various aspects of the target system's memory space, to read and write access individual addresses, and to perform various functions on the contents of the target system memory.

ByteArray

A ByteArray interface 110 includes methods allowing a client application to define and read and write access data arrays within the target system memory.

Trigger

A Trigger interface 112 includes methods enabling a client application to program triggering circuit 42 to produce its various output trigger signals in response to selected DATA, ADDRESS, CONTROL, and OTHER signal patterns.

TraceFrame

A TraceFrame interface 114 includes methods enabling a client to define the signal patterns that tell triggering circuit 42 when to start and stop trace memory 40 data acquisition and enabling the client to obtain the data acquired by the trace memory.

FlashConfiguration

A FlashConfiguration interface 116 allows a client to determine various parameters of FlashMemory 23.

NetworkConfiguration

A NetworkConfiguration interface 118 allows an administrative client application to learn or reconfigure the emulator's network interface.

Thus has been shown and described an interface system in accordance with the invention for enabling conventional software applications running on host computers linked via a network to communicate with in-circuit emulators having communication ports accessed through the network. The interface system represents each in-circuit emulator as a separate COM object, each having a set of interfaces and each interface including a set of methods for carrying out various in-circuit emulator programming and data transfer functions. Thus to communicate with an emulator, a software application need only link to an instance of the emulator's COM object and thereafter make calls to the methods included in the object's interfaces. The system as described also permits an application linking to an instance of an in-circuit emulator's COM object to optionally block other applications from linking to other instances of that COM object to prevent conflicts in control over the in-circuit emulator.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A method for enabling a software application running on a host computer to communicate with an in-circuit emulator, the method comprising the steps of:

linking the host computer and the in-circuit emulator through a physical communication path;

providing a component object model (COM) object having at least one interface including methods which, when invoked, provide communication between said in-circuit emulator and said software application via the physical communication path;

creating a first instance of said COM object; and linking the software application to the first instance of the COM object, wherein said software application invokes the methods of the at least one COM object interface to communicate with said in-circuit emulator via the physical communication path, wherein said in-circuit emulator includes a microprocessor having a computer bus having a plurality of lines and a trace memory means linked to said computer bus for acquiring and storing a sequence of data appearing on said computer bus, and wherein said COM object includes an interface having methods said software application invokes to control when said trace memory means acquires and stores said sequence of data and to obtain the sequence of data stored in said trace memory means.

2. The method in accordance with claim 1 wherein said microprocessor has an internal register, wherein said in-circuit emulator also includes register access means for accessing said internal register of said microprocessor, and wherein said COM object includes an interface having methods said software application invokes to access said internal register via said register access means.

3. The method in accordance with claim 1 wherein said in-circuit emulator also includes microprocessor control means for starting and stopping operation of said microprocessor, and wherein said COM object includes an interface having methods said software application invokes to start and stop operation of said microprocessor via said microprocessor control means.

4. The method in accordance with claim 1 wherein said in-circuit emulator also includes gating means for accessing lines of said bus, and wherein said COM object includes GatedSignal interfaces, each corresponding to a separate line accessed by said gating means, each GatedSignal interface having methods said software application invokes to access its corresponding line via said gating means.

5. The method in accordance with claim 1 wherein said computer bus links said microprocessor to a target system memory having a first addressable storage locations, each having a separate address;

wherein said in-circuit emulator includes memory access means for read and write accessing said first addressable storage locations via said computer bus; and wherein said COM object includes Address interfaces, each corresponding to a separate one of said first addressable storage locations, each Address interface having methods said software application invokes to access a corresponding first addressable storage location via said memory access means.

6. The method in accordance with claim 5 wherein said in-circuit emulator also includes an overlay memory including a plurality of second addressable storage locations;

wherein said in-circuit emulator also includes data routing means for selectively routing data conveyed on said bus to said overlay memory and said target system memory; and wherein said COM object includes a MemoryMap interface having methods said software application invokes to control a manner in which said data routing means routes said data conveyed on said bus.

7. The method in accordance with claim 1 wherein said microprocessor includes an internal breakpoint register for storing an address, wherein said microprocessor selectively operates in a diagnostic mode in which it halts operation when the address stored in said breakpoint register appears on said bus;

wherein said in-circuit memory includes means for accessing said breakpoint register and for setting said microprocessor to operate in said diagnostic mode; and wherein said COM object includes an interface having methods said software application invoke to set said microprocessor in said Breakpoints mode and to access said breakpoint register.

8. The method in accordance with claim 1 wherein said in-circuit emulator also includes a triggering circuit connected to said bus for producing a trigger signal when a particular signal pattern occurs on said bus; and wherein said COM object includes an interface having methods said software application invokes to define said particular signal pattern.

9. A system for permitting software applications, one or more of which are running on each of a plurality of host computers to communicate with a plurality of in-circuit emulators, the system comprising:

network means for providing communication paths between said host computers and said in-circuit emulators;

a plurality of component object model (COM) objects accessible to said host computers, each COM object comprising software corresponding to a separate one of said in-circuit emulators and having at least one interface including methods which, when invoked, provide communication between the corresponding in-circuit emulator and one of said software applications; and applications interface means executed by said host computers for creating a first instance of said COM object in response to a request from any one of said software applications, for permitting a requesting software application to link to said first instance, and for thereafter permitting the requesting software application to invoke the methods of the COM object interfaces to communicate with a corresponding in-circuit emulator.

10. The system in accordance with claim 9 wherein said applications interface means prevents creation of other instances of said COM object while said requesting software application is linked to said first instance of said COM object.

11. The system in accordance with claim 10 wherein each said in-circuit emulator includes a microprocessor having a computer bus having a plurality of lines and a trace memory means linked to said computer bus for acquiring and storing a sequence of data appearing on said computer bus, and wherein said COM object includes an interface having methods said software applications invoke to control when said trace memory means of data stored in said trace memory means.

12. The system in accordance with claim 11 wherein said microprocessor has an internal register, wherein each said in-circuit emulator also includes register access means for accessing said internal register of said microprocessor, and wherein said COM object includes an interface having methods said software applications invoke to access said internal register via said register access means.

13. The system in accordance with claim 11 wherein each said in-circuit emulator also includes microprocessor control means for starting and stopping operation of said microprocessor, and wherein said COM object includes an interface having methods said software applications invoke to start and stop operation of said microprocessor via said microprocessor control means.

14. The system in accordance with claim 11 wherein each said in-circuit emulator also includes gating means for accessing lines of said bus, and wherein said COM object includes GatedSignal interfaces, each corresponding to a separate line accessed by said gating means, each GatedSignal interface having methods said software applications invoke to access its corresponding line via said gating means.

15. The system in accordance with claim 11 wherein said bus links said microprocessor to a target system memory having a first addressable storage locations, each having a separate address;

wherein each said in-circuit emulator includes memory access means for read and write accessing said first addressable storage locations via said bus; and wherein said COM object includes Address interfaces, each corresponding to a separate one of said first addressable storage locations, each Address interface having methods said software applications invoke to access a corresponding first addressable storage location via said memory access means.

16. The system in accordance with claim 15 wherein each said in-circuit emulator also includes an overlay memory including a plurality of second addressable storage locations;

wherein each said in-circuit emulator also includes data routing means for selectively routing data conveyed on said bus to said overlay memory and said target system memory; and wherein said COM object includes a MemoryMap interface having methods said software applications invoke to control a manner in which said data routing means routes said data conveyed on said bus.

17. The system in accordance with claim 11 wherein said microprocessor includes an internal breakpoint register for storing an address, wherein said microprocessor selectively operates in a diagnostic mode in which it halts operation when the address stored in said breakpoint register appears on said bus;

wherein said in-circuit memory includes means for accessing said breakpoint register and for setting said microprocessor to operate in said diagnostic mode; and wherein said COM object includes an interface having methods said software applications invoke to set said microprocessor in said Breakpoints mode and to access said breakpoint register.

18. The system in accordance with claim 11 wherein said in-circuit emulator also includes a triggering circuit connected to said bus for producing a trigger signal when a particular signal pattern occurs on said bus; and wherein said COM object includes an interface having methods said software applications invoke to define said particular signal pattern.

\* \* \* \* \*

UNITED STATES PATENT AND TRADEMARK OFFICE
CERTIFICATE OF CORRECTION

PATENT NO.     : 6,571,356 B1
DATED          : May 27, 2003
INVENTOR(S)    : Jamshid Mehr and Gregory Charles Savin It is certified that error appears in the above-identified patent and that said Letters Patent is hereby corrected as shown below:

<u>Column 10,</u>
Line 57, -- acquires and stores said sequence of data and to obtain the sequence -- should be inserted after "means"

Signed and Sealed this

Ninth Day of September, 2003

JAMES E. ROGAN
*Director of the United States Patent and Trademark Office*